(12) United States Patent
Kamiya et al.

(10) Patent No.: US 9,816,737 B2
(45) Date of Patent: Nov. 14, 2017

(54) DC POWER-SUPPLY DEVICE AND REFRIGERATION CYCLE DEVICE

(71) Applicant: Mitsubishi Electric Corporation, Tokyo (JP)

(72) Inventors: Shota Kamiya, Tokyo (JP); Kazunori Hatakeyama, Tokyo (JP); Norikazu Ito, Tokyo (JP); Kenta Yuasa, Tokyo (JP); Shoji Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/030,389

(22) PCT Filed: Oct. 29, 2013

(86) PCT No.: PCT/JP2013/079288
§ 371 (c)(1),
(2) Date: Apr. 19, 2016

(87) PCT Pub. No.: WO2015/063869
PCT Pub. Date: May 7, 2015

(65) Prior Publication Data
US 2016/0265822 A1   Sep. 15, 2016

(51) Int. Cl.
*F25B 21/02* (2006.01)
*H02M 7/217* (2006.01)
(Continued)

(52) U.S. Cl.
CPC ............... *F25B 31/02* (2013.01); *H02M 1/08* (2013.01); *H02M 1/12* (2013.01); *H02M 1/32* (2013.01);
(Continued)

(58) Field of Classification Search
CPC ............ H02M 1/08; H02M 1/12; H02M 1/32; H02M 1/36; H02M 1/42; H02M 1/4225;
(Continued)

(56) References Cited

U.S. PATENT DOCUMENTS 5,430,639 A   7/1995 Takahashi
6,137,700 A   10/2000 Iida et al.
(Continued)

FOREIGN PATENT DOCUMENTS

CN   101340140 A   1/2009
EP   2164161 A2   3/2010
(Continued)

OTHER PUBLICATIONS

Yamadaya Masayuki, Multi-Channel Power Supply Circuit Arrangement, Power Supply Control Integrated Circuit and Soft Start Circuit, Jan. 22, 2004, JPO, JP 2004023948(A).*
(Continued)

*Primary Examiner* — Adolf Berhane
*Assistant Examiner* — Bart Iliya
(74) *Attorney, Agent, or Firm* — Posz Law Group, PLC (57) ABSTRACT

A DC power-supply device that suppresses an excessive inrush current, can prevent breakage of elements and burn-out of circuits, and converts alternating current from a three-phase AC power supply into direct current to supply it to a load, includes a rectifier circuit having a reactor connected to input or output side thereof and rectifying the alternating current from the three-phase AC power supply; first and second capacitors and connected in series between output terminals to the load; a charging unit selectively charges one or both of the first and second capacitors; and a control unit controlling the charging unit. When charging of the first and second capacitors is started, the control unit reduces the on-duty ratio, and then, until the on-duty ratio
(Continued)

during a normal operation is reached, the control unit executes control such that the on-duty ratio is gradually increased as a predetermined time period is passed.

13 Claims, 9 Drawing Sheets

(51) Int. Cl.
  $H02M\ 3/158$ (2006.01)
  $H02M\ 1/32$ (2007.01)
  $H02M\ 1/42$ (2007.01)
  $F25B\ 31/02$ (2006.01)
  $H02M\ 7/06$ (2006.01)
  $H02M\ 1/36$ (2007.01)
  $H02M\ 1/08$ (2006.01)
  $H02M\ 1/12$ (2006.01)
  $H02M\ 1/00$ (2006.01)
(52) U.S. Cl.
  CPC ............. $H02M\ 1/36$ (2013.01); $H02M\ 1/42$ (2013.01); $H02M\ 1/4225$ (2013.01); $H02M\ 3/158$ (2013.01); $H02M\ 7/06$ (2013.01); $H02M\ 7/062$ (2013.01); $H02M\ 7/217$ (2013.01); $H02M\ 2001/007$ (2013.01); $H02M\ 2001/0009$ (2013.01); $Y02B\ 70/126$ (2013.01)
(58) Field of Classification Search
  CPC ... H02M 2001/0009; H02M 2001/007; H02M 3/158; H02M 7/06; H02M 7/062; H02M 7/217
  See application file for complete search history.

(56) References Cited

U.S. PATENT DOCUMENTS

| | | | |
|---|---|---|---|
| 6,181,583 | B1 | 1/2001 | Okui et al. |
| RE39,060 | E | 4/2006 | Okui et al. |
| 7,274,579 | B2 | 9/2007 | Ueda et al. |
| 7,403,400 | B2 | 7/2008 | Stanley |
| 7,576,299 | B2 | 8/2009 | Rossetto et al. |
| 7,733,616 | B2 | 6/2010 | Yamada |
| 8,269,141 | B2 | 9/2012 | Daniel et al. |
| 8,278,896 | B2 | 10/2012 | Horii |
| 8,498,136 | B2 | 7/2013 | Shinomoto et al. |
| 8,581,147 | B2 | 11/2013 | Kooken et al. |
| 8,823,303 | B2 | 9/2014 | Shinomoto et al. |
| 2004/0124807 | A1* | 7/2004 | Nakata ................. H02P 21/00 318/801 |
| 2006/0175313 | A1 | 8/2006 | Kooken et al. |
| 2010/0054007 | A1* | 3/2010 | Jung ..................... H02M 7/06 363/126 |
| 2011/0019452 | A1 | 1/2011 | Shinomoto et al. |
| 2014/0268934 | A1* | 9/2014 | Tolbert ................. H02M 7/219 363/44 |

FOREIGN PATENT DOCUMENTS

| | | | |
|---|---|---|---|
| JP | 58-204770 A | 11/1983 |
| JP | 58-207870 A | 12/1983 |
| JP | 03-003189 U | 1/1991 |
| JP | 03-101187 U | 10/1991 |
| JP | H05-328729 | 12/1993 |
| JP | 06-253540 A | 9/1994 |
| JP | 08-186981 A | 7/1996 |
| JP | 08-237957 A | 9/1996 |
| JP | 2539158 Y2 | 4/1997 |
| JP | 10-174442 A | 6/1998 |
| JP | 2000-146392 A | 5/2000 |
| JP | 2000-278955 A | 10/2000 |
| JP | 2000-324843 A | 11/2000 |
| JP | 2001-050625 A | 2/2001 |
| JP | 2001-145360 | 5/2001 |
| JP | 2001-286130 A | 10/2001 |
| JP | 2002-176778 A | 6/2002 |
| JP | 2004-023948 | 1/2004 |
| JP | 2004-180422 A | 6/2004 |
| JP | 2005-045995 A | 2/2005 |
| JP | 2005-110491 A | 4/2005 |
| JP | 2005-323440 A | 11/2005 |
| JP | 2006-026736 A | 2/2006 |
| JP | 2006-223092 A | 8/2006 |
| JP | 2006-271185 A | 10/2006 |
| JP | 2006-325306 A | 11/2006 |
| JP | 2007-166783 A | 6/2007 |
| JP | 2008-012586 A | 1/2008 |
| JP | 2008-295228 A | 12/2008 |
| JP | 2009-050109 A | 3/2009 |
| JP | 2009-273230 A | 11/2009 |
| JP | 4460572 B2 | 2/2010 |
| JP | 2010-068642 A | 3/2010 |
| JP | 2010-263739 A | 11/2010 |
| JP | 2011-036020 A | 2/2011 |
| JP | 2011-061887 A | 3/2011 |
| JP | 2011-244635 A | 12/2011 |
| JP | 2012-060801 A | 3/2012 |
| JP | 2012-165539 A | 8/2012 |
| JP | 2012-191761 | 10/2012 |
| JP | 2012-231646 A | 11/2012 |
| JP | 5087346 B2 | 12/2012 |
| JP | 2013-038921 A | 2/2013 |
| JP | 2013-110839 A | 6/2013 |
| JP | 5274579 B2 | 8/2013 |
| WO | 2004/071703 A1 | 8/2004 |
| WO | 2009/028053 | 3/2009 |
| WO | 2013/057857 | 4/2013 |

OTHER PUBLICATIONS

Notohara Yasuo et al, Power Foctor Improving Circuit, Motor Controller and Air Conditioner, May 25, 2001, JPO, JP 2001145360(A).*
U.S. Appl. No. 14/787,527, filed Oct. 28, 2015, Kamiya et al.
U.S. Appl. No. 14/909,498, filed Feb. 2, 2016, Hatakeyama et al.
U.S. Appl. No. 15/029,648, filed Apr. 15, 2016, Shinomoto et al.
International Search Report dated Dec. 3, 2013 in corresponding PCT application No. PCT/JP2013/079288 (with English translation).
International Search Report dated Dec. 10, 2013 in a related PCT application No. PCT/JP2013/078298 (with English translation).
International Search Report dated Oct. 29, 2013 in a related PCT application No. PCT/JP2013/074091 (with English translation).
International Search Report dated Aug. 6, 2013 in a related PCT application No. PCT/JP2013/067395 (with English translation).
Office Action dated Jan. 31, 2017 issued in corresponding CA patent application No. 2,927,417.
Office Action dated Mar. 1, 2017 issued in the related CA patent application No. 2,929,041.
Office Action dated Dec. 13, 2016 issued in corresponding JP patent application No. 2015-544677 (and English translation).
Office Action dated Jul. 28, 2017 issued in the related Chinese patent application No. 201380079210.8 (and partial English translation).
Office Action dated Sep. 5, 2017 issued in the related Chinese patent application No. 201380080234.5 (and partial English translation).
Office Action dated Sep. 1, 2017 issued in corresponding KR patent application No. 10-2016-7009576 (and partial English translation).

* cited by examiner

FIG.10

DC POWER-SUPPLY DEVICE AND REFRIGERATION CYCLE DEVICE

CROSS REFERENCE TO RELATED APPLICATION

This application is a U.S. national stage application of International Patent Application No. PCT/JP2013/079288 filed on Oct. 29, 2013, the disclosure of which is incorporated herein by reference.

TECHNICAL FIELD

The present invention relates to a DC power-supply device and a refrigeration cycle device that includes the DC power-supply device.

BACKGROUND

Conventional DC power-supply devices are known that have an inverter as a load, with the invertor driving a compressor motor used in an air conditioner, a heat-pump water heater, a refrigerator, and a freezer, that are connected to the load, and that convert an alternating current into a direct current. Patent Literature 1, for example, discloses a DC power-supply device that can convert a single-phase alternating current into a direct current and can boost the output voltage with a simple configuration.

PATENT LITERATURE

Patent Literature 1: Japanese Patent Application Laid-open No. 2000-278955

However, according to the conventional technology described above, if an excessive inrush current to a capacitor is generated when a switching operation is started, the inrush current cannot be suppressed. Therefore, there is a problem in that elements in the power-supply device may be broken and circuits in the device may be burned out.

SUMMARY

The present invention has been achieved in view of the above problem, and an object of the present invention is to provide a DC power-supply device that can suppress an excessive inrush current generated when a switching operation is started and can prevent breakage of elements and burnout of circuits.

In order to solve the above problems and achieve the object, an aspect of the present invention is a DC power-supply device that converts an alternating current from a three-phase AC power supply into a direct current and supplies the converted current to a load, the DC power-supply device including: a rectifier circuit that has a reactor connected to an input side or an output side thereof and that rectifies the alternating current from the three-phase AC power supply; a first capacitor and a second capacitor that are connected in series between output terminals to the load; a charging unit that selectively charges one or both of the first capacitor and the second capacitor; and a control unit that controls the charging unit, wherein when charging of the first capacitor and the second capacitor is started, the control unit reduces an on-duty ratio in order to suppress a charging current so that a charging peak current flowing to the first capacitor and the second capacitor is suppressed to be equal to or smaller than an allowable value of the charging unit or the rectifier circuit, and then, until an on-duty ratio during a normal operation is reached, the control unit executes control such that the on-duty ratio is gradually increased as a predetermined time period is passed.

According to the present invention, an effect is obtained where it is possible to obtain a DC power-supply device that can suppress an excessive inrush current generated when a switching operation is started and can prevent breakage of elements and burnout of circuits.

DETAILED DESCRIPTION

Exemplary embodiments of a DC power-supply device and a refrigeration cycle device that includes the DC power-supply device according to the present invention will be explained below in detail with reference to the accompanying drawings. The present invention is not limited to the embodiments.

First Embodiment

Figure 1:
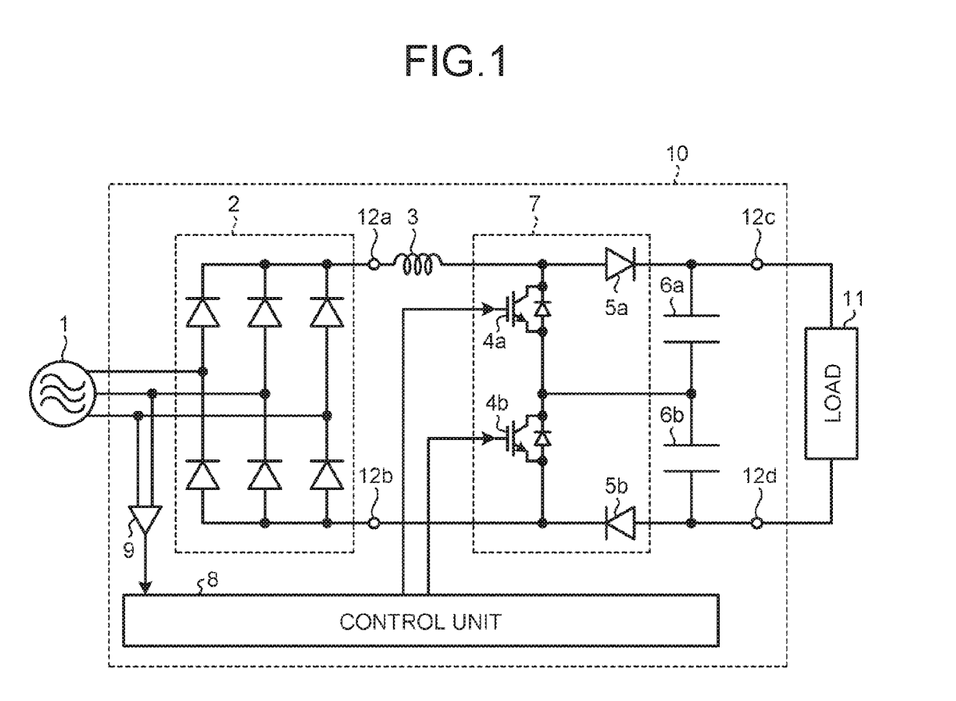
FIG. 1 is a diagram illustrating a configuration example of a DC power-supply device according to a first embodiment.

FIG. 1 is a diagram illustrating a configuration example of a DC power-supply device according to a first embodiment of the present invention. A DC power-supply device 10 illustrated in FIG. 1 converts a three-phase alternating current supplied from a three-phase AC power supply 1 into a direct current and supplies the converted current to a load 11. The load 11 can be exemplified by an inverter load that drives a compressor motor used in a refrigeration cycle device.

The DC power-supply device 10 includes a rectifier circuit 2 that rectifies a three-phase alternating current; a reactor 3 connected to the output side of the rectifier circuit 2; a first capacitor 6a and a second capacitor 6b that are connected in series between the output terminals to the load 11; a charging unit 7 that selectively charges the first capacitor 6a and the second capacitor 6b, a control unit 8 that controls the charging unit 7; and a power-supply voltage detection unit 9 that detects the voltage of a three-phase alternating current. The power-supply voltage detection unit 9 detects the line voltage between two phases (an r-phase and an s-phase) in a three-phase alternating current supplied from the three-phase AC power supply 1. For the convenience of explanation, terminals 12a to 12d are illustrated in FIG. 1.

The rectifier circuit 2 is a three-phase full-wave rectifier circuit in which six rectifier diodes are connected in a full-bridge.

In FIG. 1, while the reactor 3 is a DC reactor, it can be an AC reactor in which the reactor 3 is provided on the input side of the rectifier circuit 2.

The charging unit 7 includes a first switching element 4a, a second switching element 4b, a first backflow prevention element 5a, and a second backflow prevention element 5b.

The first switching element 4a controls charging of the second capacitor 6b. The second switching element 4b controls charging of the first capacitor 6a. The first switching element 4a and the second switching element 4b can be exemplified by a power transistor, a power MOSFET (Metal Oxide Semiconductor Field Emission Transistor), and an IGBT (Insulated Gate Bipolar Transistor).

The first backflow prevention element 5a is connected in the forward direction from the collector of the first switching element 4a toward the connection point between the first capacitor 6a and the load 11, and prevents backflow of an electric charge stored in the first capacitor 6a to the first switching element 4a. The second backflow prevention element 5b is connected in the forward direction from the connection point between the second capacitor 6b and the load 11 toward the emitter of the second switching element 4b, and prevents backflow of an electric charge stored in the second capacitor 6b to the second switching element 4b.

The first capacitor 6a and the second capacitor 6b are set to have the same capacity, and the connection point between the serially connected first capacitor 6a and second capacitor 6b is connected to the connection point between the serially connected first switching element 4a and second switching element 4b.

The control unit 8 controls the DC voltage supplied to the load 11 by controlling the switching of the first switching element 4a and the second switching element 4b. The switching control executed by the control unit 8 is described below with reference to FIG. 2.

Figure 2:
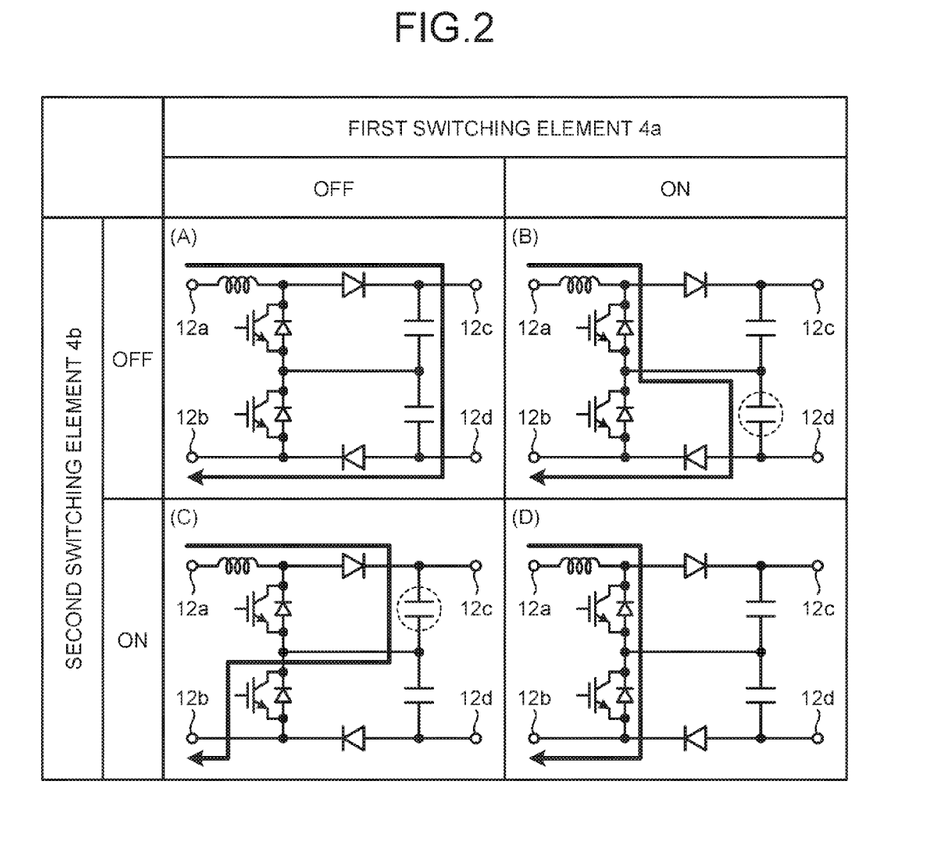
FIG. 2 is a diagram illustrating the correspondence relation between switching control of a first switching element and a second switching element and capacitors to be charged, in the DC power-supply device according to the first embodiment.

FIG. 2 is a diagram illustrating the correspondence relation between the switching control of the first switching element 4a and the second switching element 4b and capacitors to be charged (state), in the DC power-supply device according to the present embodiment.

When both the first switching element 4a and the second switching element 4b are turned off, both the first capacitor 6a and the second capacitor 6b are charged ((A) in FIG. 2).

When the first switching element 4a is turned on and the second switching element 4b is turned off, only the second capacitor 6b is charged ((B) in FIG. 2).

When the first switching element 4a is turned off and the second switching element 4b is turned on, only the first capacitor 6a is charged ((C) in FIG. 2).

When both the first switching element 4a and the second switching element 4b are turned on, the first switching element 4a and the second switching element 4b are short-circuited, so that neither of the first capacitor 6a and the second capacitor 6b is charged ((D) in FIG. 2).

That is, when the first switching element 4a is turned on, the second capacitor 6b is charged, and when the second switching element 4b is turned on, the first capacitor 6a is charged. In this manner, as the switching of the first switching element 4a and the second switching element 4b is performed, the capacitor to be charged can be selected. Further, as described below, the DC voltage to be supplied to the load 11 can be controlled.

Figure 3:
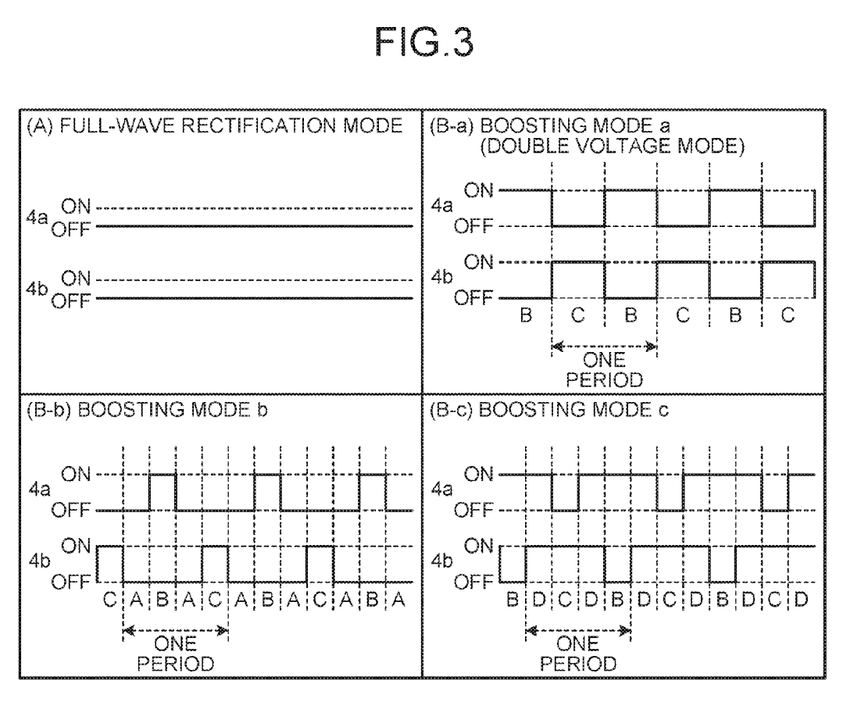
FIG. 3 is a diagram illustrating an operation mode of the DC power-supply device according to the first embodiment.

FIG. 3 is a diagram illustrating operation modes of the DC power-supply device 10 according to the present embodiment. Examples of the operation modes of the DC power-supply device 10 include the following: a full-wave rectification mode ((A) in FIG. 3) in which the first switching element 4a and the second switching element 4b are always turned off; and a boosting mode ((B-a) to (B-c) in FIG. 3) in which the first switching element 4a and the second switching element 4b are alternately turned on.

Examples of the boosting mode include a boosting mode a (a double voltage mode) in which the on-duty ratios of the first switching element 4a and the second switching element 4b illustrated in (B-a) in FIG. 3 are 50%; a boosting mode b in which the on-duty ratios of the first switching element 4a and the second switching element 4b illustrated in (B-b) in FIG. 3 are less than 50%; and a boosting mode c in which the on-duty ratios of the first switching element 4a and the second switching element 4b illustrated in (B-c) in FIG. 3 are larger than 50%.

In the full-wave rectification mode illustrated in (A) in FIG. 3, both the first switching element 4a and the second switching element 4b are always turned off, and the voltage full-wave rectified by the rectifier circuit 2 becomes the output voltage. This output voltage is designated as $V_0$.

In the boosting mode a (the double voltage mode) illustrated in (B-a) in FIG. 3, the timing with which the first switching element 4a is turned on and the timing with which the second switching element 4b is turned off are ideally simultaneous, the timing with which the first switching element 4a is turned off and the timing with which the second switching element 4b is turned on are ideally simultaneous, and the state of (B) in FIG. 2 and the state of (C) in FIG. 2 are repeated. The output voltage at this point becomes twice as large as the output voltage in the full-wave rectification mode illustrated in (A) in FIG. 3. That is, the output voltage at this point is $2V_0$. It is possible to provide a short-circuit prevention time (generally referred to as "dead time") in which a simultaneous short-circuit of the first switching element 4a and the second switching element 4b is prevented, and as described above, in the present embodiment, the timings with which these elements are turned on and off are ideally set to be simultaneous regardless of the presence or absence of a dead time.

In the boosting mode b illustrated in (B-b) in FIG. 3, there is a "simultaneous off-time period" during which both the first switching element 4a and the second switching element 4b are simultaneously turned off. As the operations in the boosting mode b illustrated in (B-b) in FIG. 3 are expressed with the signs in FIG. 2, transitions from (C) to (A), (A) to (B), (B) to (A), and (A) to (C) are periodically repeated. The output voltage at this point has a voltage value between the output voltage $V_0$ in the full-wave rectification mode illustrated in (A) in FIG. 3 and the output voltage $2V_0$ in the boosting mode a (the double voltage mode) illustrated in (B-a) in FIG. 3.

In the boosting mode c illustrated in (B-c) in FIG. 3, there is a "simultaneous on-time period" during which both the first switching element 4a and the second switching element 4b are simultaneously turned on. As the operations in the boosting mode c illustrated in (B-c) in FIG. 3 are expressed with the signs in FIG. 2, transitions from (B) to (D), (D) to (C), (C) to (D), and (D) to (B) are periodically repeated. In the state of (D), that is, during the "simultaneous on-time period", energy is accumulated in the reactor 3. The output voltage at this point is larger than the output voltage $2V_0$ in the boosting mode a (the double voltage mode) illustrated in (B-a) in FIG. 3.

In this manner, by changing the on-duty ratios of the first switching element 4a and the second switching element 4b, the output voltage (a DC voltage) to the load 11 can be controlled.

Next, with reference to FIGS. 4 to 7, the charging frequency of the first capacitor 6a and the second capacitor 6b in an initial charging mode of the DC power-supply device 10 is described. The "charging frequency" is the "switching frequency" that is the inverse of a charging period. In the "charging period", a time period obtained by combining a charging time period and a non-charging time period of a pair of the first capacitor 6a and the second capacitor 6b, that is, a time period obtained by combining an on-time period and an off-time period of a pair of the first switching element 4a and the second switching element 4b, is assumed to be one period.

In the following descriptions, the "charging frequency" is used for the descriptions mainly expressing the first capacitor 6a or the second capacitor 6b, and the "switching frequency" is used for the descriptions mainly expressing the first switching element 4a or the second switching element 4b.

Figure 5:
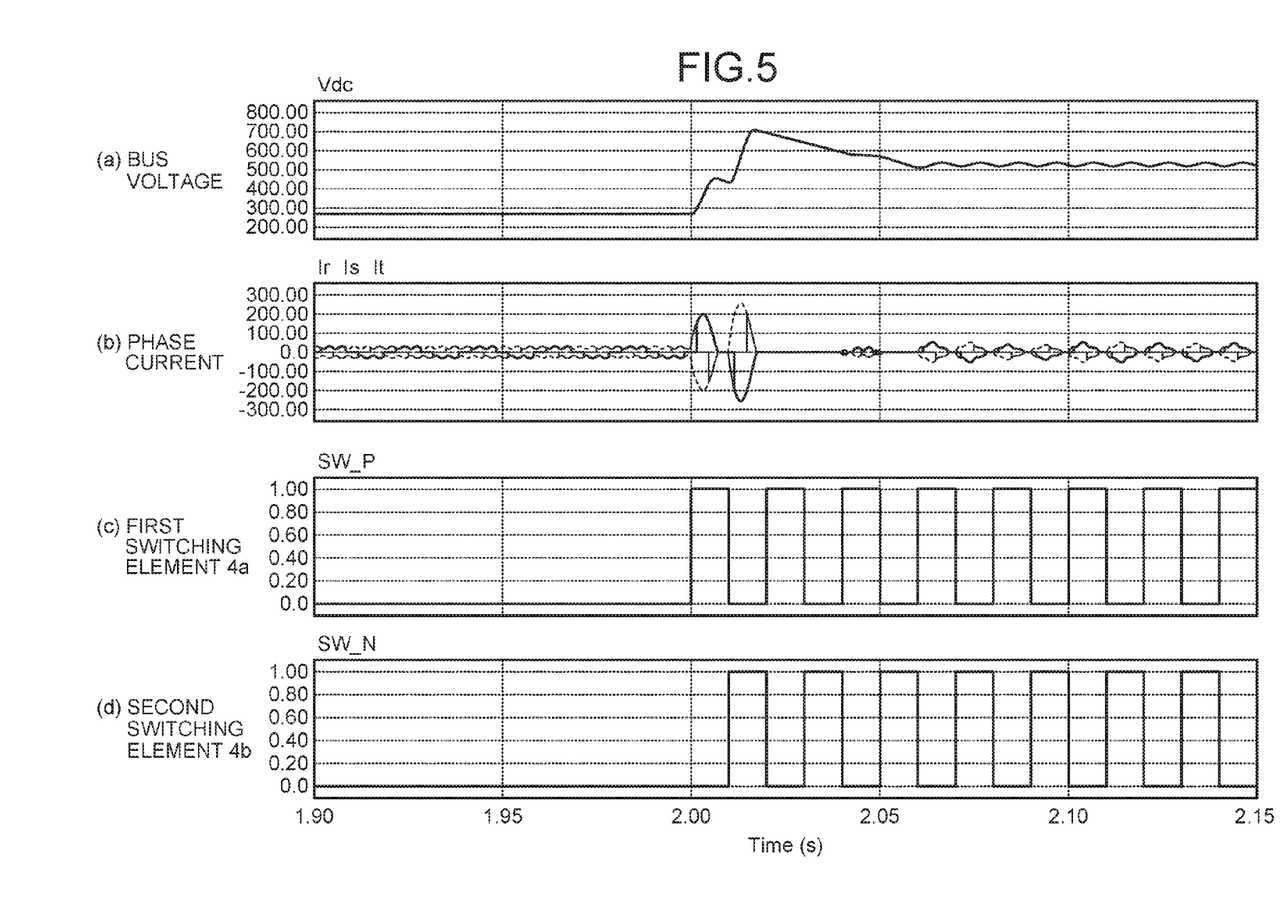
FIG. 5 is a diagram illustrating a comparative example representing switching patterns, a converter-output DC voltage, and an example of simulation waveforms of respective phase currents of a three-phase alternating current in a conventional DC power-supply device.

First, FIG. 5 is a diagram illustrating a comparative example representing switching patterns, an example of a simulation waveform of a converter-output DC voltage (hereinafter, "bus voltage"), and an example of simulation waveforms of respective phase currents of a three-phase alternating current in a conventional DC power-supply device (a DC power-supply device that starts driving the DC power-supply device 10 at a duty ratio of 50%, which is the same as that during a normal operation, when the charging operation is started). FIG. 5(a) illustrates a simulation waveform of the output voltage of a converter circuit; and FIG. 5(b) illustrates simulation waveforms of current waveforms of an r-phase, an s-phase, and a t-phase of a three-phase alternating current. FIG. 5(c) illustrates a switching pattern of the first switching element 4a; and FIG. 5(d) illustrates a switching pattern of the second switching element 4b.

In FIG. 5(b), the current waveform of the r-phase is represented by a bold line, the current waveform of the s-phase is represented by a dotted line, and the current waveform of the t-phase is represented by a thin solid line.

If the first switching element 4a and the second switching element 4b are switched at a duty ratio of 50% in this way, when the switching operation is started (Time=2.0 seconds), an excessive inrush current appears on the current waveforms of respective phases. This phenomenon happens not only in the case where the duty ratio is 50% but also in other cases where the on-time is long. The excessive inrush current is, for example, an inrush current exceeding double the phase current during a normal operation.

Figure 4:
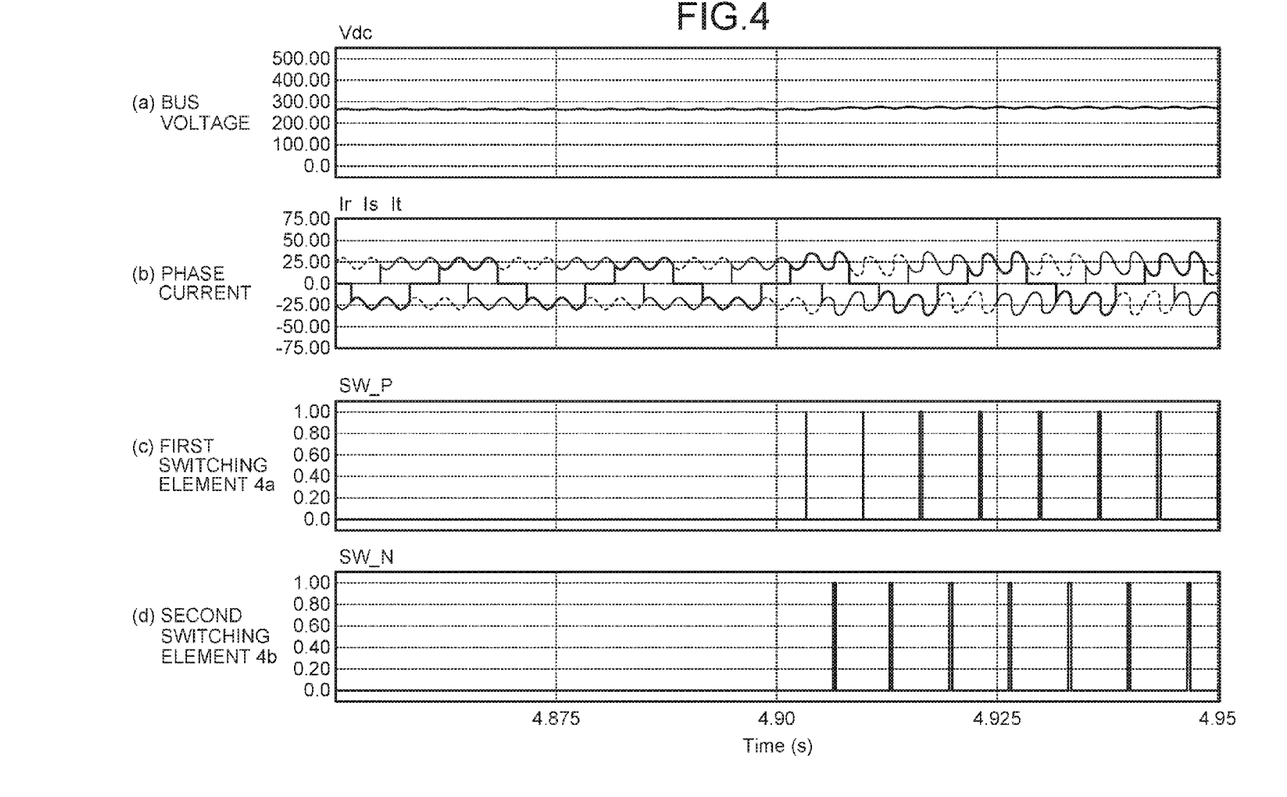
FIG. 4 is a diagram illustrating an example representing switching patterns, a converter-output DC voltage, and an example of simulation waveforms of respective phase currents of a three-phase alternating current in the DC power-supply device according to the first embodiment.

An example of the present invention to be compared to the comparative example described above is illustrated in FIG. 4. FIG. 4 is a diagram illustrating an example representing switching patterns, an example of a simulation waveform of a converter-output DC voltage, and an example of simulation waveforms of respective phase currents of a three-phase alternating current in the DC power-supply device 10 to which the present invention is applied. FIG. 4(a) illustrates an example of a simulation waveform of a bus voltage; FIG. 4(b) illustrates an example of simulation waveforms of currents of respective phases (an r-phase, an s-phase, and a t-phase) of a three-phase alternating current; FIG. 4(c) illustrates a switching pattern of the first switching element 4a; and FIG. 4(d) illustrates a switching pattern of the second switching element 4b. It is noted that the scale of the vertical axis is different between FIG. 4(a) and FIG. 5(a) and also between FIG. 4(b) and FIG. 5(b).

In FIG. 4, when the charging operation is started, the on-duty ratio is set to be small enough to cause the change in an initial transient charging current (inrush current) to be small. That is, the on-duty ratio is set to be small enough, as calculated on the basis of the capacitor capacity, to set a change amount thereof such that an inrush current can be suppressed. As the on-duty ratio is set to be small enough and the change amount of the on-duty ratio is made small, as illustrated in FIG. 4(b), it is possible to execute control such that the current waveforms of respective phase currents are not distorted and no excessive current is generated.

As illustrated in FIG. 5, conventionally, when a single-phase alternating current or a three-phase alternating current is used as an input and a single-phase or three-phase full-wave rectifier circuit to which four rectifier diodes are connected in a full bridge is used as a rectifier circuit, in light of the imbalance or power factor improvement of the first capacitor 6a and the second capacitor 6b and voltage boosting effect of bus voltage, during a normal operation, switching control is executed at a duty ratio of 50%, and there is no particular control when the charging operation is started.

In contrast, in the present embodiment, when charging of the first capacitor 6a and the second capacitor 6b is started, the control unit 8 performs a switching operation such that the on-duty ratio becomes small.

Switching signals when the charging operation is started and during a normal operation according to the present embodiment are presented here, and the difference between the on-duty ratios in both cases is described.

Figure 6:
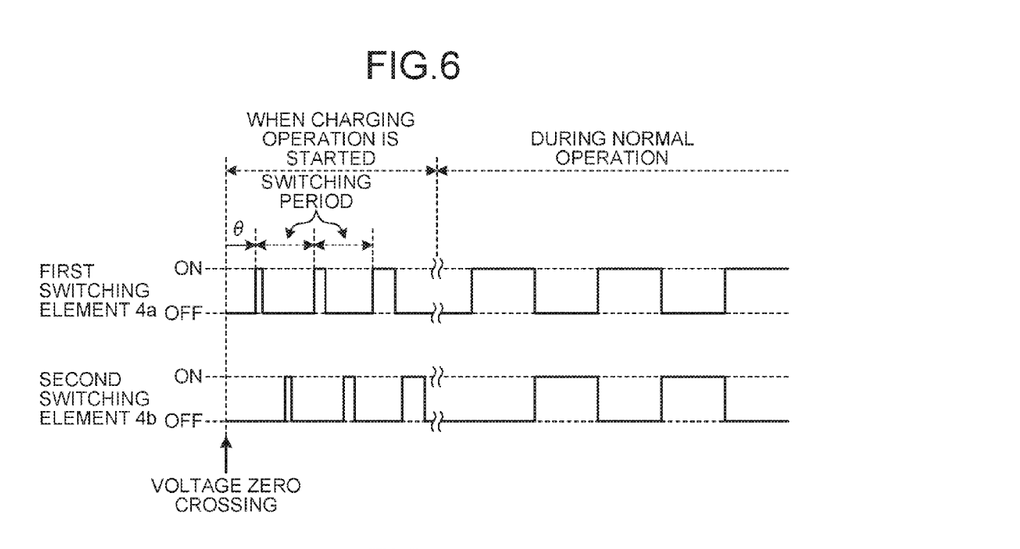
FIG. 6 is a diagram illustrating switching signals when the charging operation is started and during a normal operation, where the signals are generated in a control unit of the DC power-supply device according to the first embodiment.

FIG. 6 is a diagram illustrating switching signals when the charging operation is started and during a normal operation, where the switching signals are generated in the control unit 8. In FIG. 6, control is performed such that the on-duty ratio is small when the charging operation is started and subsequently the change in the on-duty ratio is gradually increased. Thereafter, during a normal operation, the on-duty ratio is increased until it becomes 50% or until the on-duty ratio reaches a value that makes it possible to output a bus voltage with a desired value. By controlling the change in the on-duty ratio such that it is gradually increased in this way, it is possible to suppress an inrush current generated after the charging operation is started. Note that it is also possible to have a configuration such that the on-duty ratio is gradually reduced before stopping the switching operation of the first switching element 4a and the second switching element 4b, thereby changing the on-duty ratio to 0%.

In any of the boosting modes a to c illustrated in FIG. 3, it is possible to suppress an excessive inrush current by controlling the on-duty ratio such that it is small when the charging operation is started and then the change in the on-duty ratio is gradually increased.

As described above, control is performed such that, when the charging operation is started, the charging time of the first capacitor 6a and the second capacitor 6b, that is, the on-duty ratios of the first switching element 4a and the second switching element 4b are set to a small value and the change in the on-duty ratio is then gradually increased.

Further, while the above descriptions are related to the boosting mode a (B-a), also in the boosting mode b ((B-b) in FIG. 3) and the boosting mode c ((B-c) in FIG. 3), by performing control such that the on-duty ratio is small when the charging operation is started and the change in the on-duty ratio is then reduced, it is possible to suppress an excessive inrush current. When an excessive inrush current is suppressed, power factor improvement and harmonic current suppression can be achieved.

The DC power-supply device 10 illustrated in FIG. 1 includes the power-supply voltage detection unit 9 that detects the voltage of a three-phase alternating current. Therefore, the control unit 8 can execute control such that, by referring to the detected voltage value of a three-phase alternating current obtained from the detection result from the power-supply voltage detection unit 9 and on the basis of the detected voltage value, the on-duty ratios of the first switching element 4a and the second switching element 4b in a boosting mode are changed.

While FIG. 1 illustrates a configuration in which the line voltage between the r-phase and the s-phase of a three-phase alternating current is detected, the present invention is not limited thereto, and it is obvious that it is also possible to have a configuration in which the line voltage between the s-phase and the t-phase or that between the t-phase and the r-phase is detected, a configuration in which all the voltages of the three phases are detected, or a configuration in which the phase voltage instead of the line voltage is detected.

Meanwhile, as illustrated in FIG. 6, the DC power-supply device 10 is controlled such that, from the time of starting of the charging operation to the time of a normal operation, the on-time is gradually increased until it reaches a certain on-duty ratio during a normal operation. In this manner, for example, the DC power-supply device 10 is controlled such that the on-duty ratio is set to be small when the full-wave rectification mode and the boosting mode are switched, and then the on-time is changed gradually to shift to the boosting mode. An example of a method of generating such a signal is described below.

Figure 7:
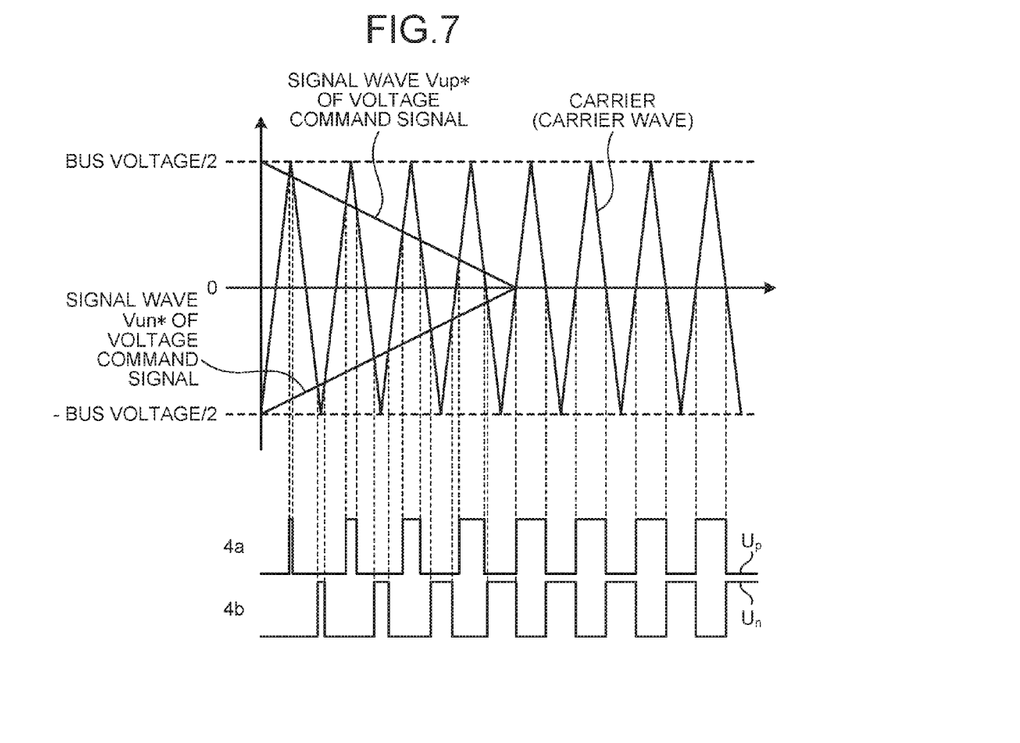
FIG. 7 is a diagram illustrating an example of a switching-signal generation method executed by the control unit of the DC power-supply device according to the first embodiment.

FIG. 7 is a diagram illustrating an example of a switching-signal generation method executed by the control unit 8. In FIG. 7, the horizontal axis represents time and the vertical axis represents voltage.

The switching signal generation method illustrated in FIG. 7 is a PWM (Pulse Width Modulation) system. Specifically, signal waves Vup* and Vun* of a voltage command signal are compared with a carrier signal (a carrier wave) with a predetermined frequency that is half the bus voltage (Vdc/2), and switching signals Up and Un are generated on the basis of the magnitude relation between these compared elements.

In FIG. 7, the voltage values of the carrier signal and the voltage command signal Vup* are compared, and when the voltage value of the carrier signal is larger than the voltage value of the voltage command signal Vup*, the first switching element 4a is turned on by the switching signal Up. Further, the voltage values of the carrier signal and the voltage command signal Vun* are compared, and when the voltage value of the carrier signal is smaller than the voltage value of the voltage command signal Vun*, the second switching element 4b is turned on by the switching signal Un.

As illustrated in FIG. 7, as the frequency of the carrier signal is constant and the voltage values of the voltage command signals Vup* and Vun* decrease in proportion to the passage of time, the on-duty ratio increases at a constant rate. In this manner, as the signal waves Vup* and Vun* of the voltage command signals are gradually changed until the duty ratio becomes 50% and the change in the on-duty ratio is made small, it is possible to suppress an excessive inrush current.

In order to perform control such that the voltage values of the voltage command signals Vup* and Vun* are gradually changed and the change in the on-duty ratio after the charging operation is started is gradually increased, the extent of reduction of the voltage values of the signal waves Vup* and Vun* of the voltage command signals, that is, the absolute values of the inclinations of the signal waves Vup* and Vun* of the voltage command signals illustrated in FIG. 7, should be made small. For example, FIG. 7 is an example of a mode in which the change in the on-duty ratio is made small, and according to a triangle formed with a carrier wave and signal waves of voltage command signals, as the first on-time of the first switching element 4a is assumed to be "t", the second on-time is 3t, the third on-time is 5t, and the fourth on-time is 7t. Similarly, as the first on-time of the second switching element 4b is assumed to be "T", the second on-time is 2T, the third on-time is 3T, and the fourth on-time is 4T.

By preventing imbalance from being generated among respective phase currents in such a manner, the distortion rates of respective phase currents are minimized, and power factor improvement and harmonic current suppression can be achieved.

As described above, the DC power-supply device 10 according to the present embodiment is the DC power-supply device 10 that converts an alternating current from the three-phase AC power supply 1 into a direct current and supplies the converted current to the load 11, and the DC power-supply device 10 includes the rectifier circuit 2 having the reactor 3 connected to an input side or an output side thereof and rectifying the alternating current from the three-phase AC power supply 1; the first capacitor 6a and the second capacitor 6b that are connected in series between output terminals to the load 11; a charging unit (the charging unit 7) that selectively charges one or both of the first capacitor 6a and the second capacitor 6b; and the control unit 8 that controls the charging unit (the charging unit 7). When charging of the first capacitor 6a and the second capacitor 6b is started, the control unit 8 controls the charging unit 7 such that a charging current is suppressed. Specifically, when charging of the first capacitor 6a and the second capacitor 6b is started, the control unit 8 shortens (make the on-duty ratio small) the on-time within one period, which is formed of one charging time period and one non-charging time period of the first capacitor 6a and the second capacitor 6b, in order to suppress the charging current so that a charging peak current to the first capacitor 6a and the second capacitor 6b is suppressed to be equal to or smaller than an allowable value of the charging unit or the rectifier circuit, and then, until the on-duty ratio during a normal operation is reached, the control unit 8 executes control such that the on-time is gradually increased (the on-duty ratio is increased) as a predetermined time period is passed. With this configuration, an excessive inrush current is not generated in respective phase currents of a three-phase alternating current. In this manner, breakage of elements and burnout of circuits can be prevented, and imbalance is not generated among respective phase currents; therefore, the distortion rates of respective phase currents are minimized. Therefore, power factor can be improved and harmonic current suppression can be achieved.

Specifically, the charging unit 7 includes the first switching element 4a that controls charging of the second capacitor 6b; the second switching element 4b that controls charging of the first capacitor 6a; the first backflow prevention element 5a that prevents backflow of a stored electric charge of the first capacitor 6a to the first switching element 4a; and the second backflow prevention element 5b that prevents backflow of a stored electric charge of the second capacitor 6b to the second switching element 4b. The first switching element 4a and the second switching element 4b are alternately turned on.

Furthermore, the control unit 8 controls the operation mode of the DC power-supply device 10. The operation mode includes a full-wave rectification mode in which the first switching element 4a and the second switching element 4b are always turned off and a boosting mode in which the first switching element 4a and the second switching element 4b are alternately turned on at a charging frequency. In the boosting mode, by changing the on-duty ratios of the first switching element 4a and the second switching element 4b according to the detection voltage value of a three-phase alternating current obtained from the detection result from the power-supply voltage detection unit 9, control is performed such that a desired output voltage can be output.

As described above, according to the present embodiment, it is possible to obtain a DC power-supply device that can suppress an excessive inrush current by detecting an excessive current generated when a switching operation is started and can prevent breakage of elements and burnout of circuits.

Second Embodiment

Figure 8:
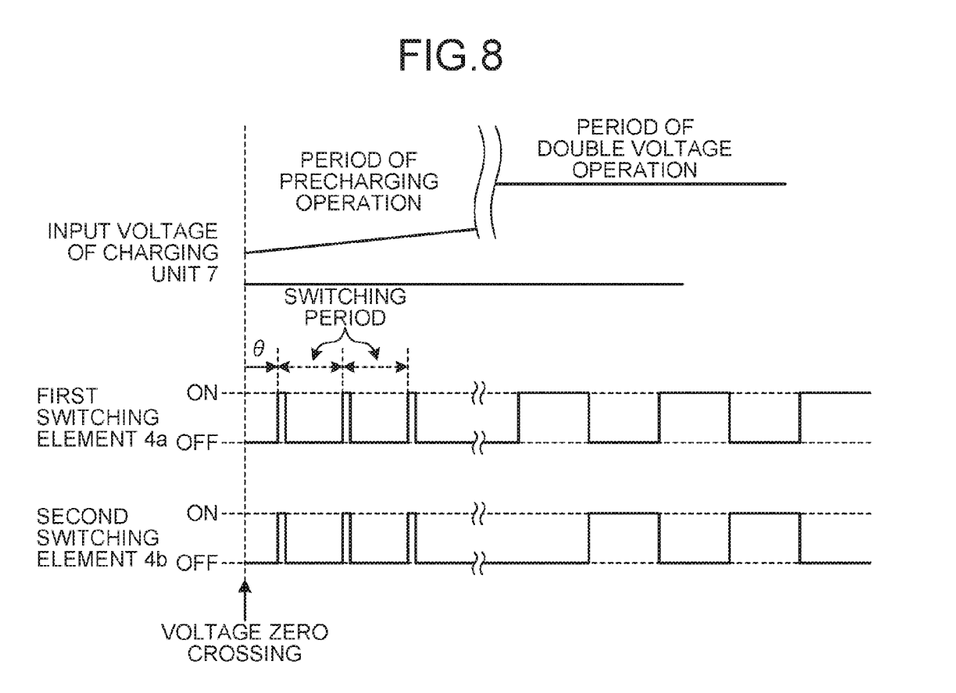
FIG. 8 is a diagram illustrating an example of control executed by a control unit of a DC power-supply device according to a second embodiment.

FIG. 8 is a diagram illustrating an example of control executed by a control unit of a DC power-supply device according to a second embodiment of the present invention. Constituent elements identical or equivalent to those of the first embodiment are denoted by like reference signs and detailed explanations thereof will be omitted.

In the present embodiment, for the purpose of suppressing an excessive inrush current flowing into the first capacitor 6a and the second capacitor 6b, by alternately repeating the state of (A) in FIG. 2 and the state of (D) in FIG. 2 as a precharging operation, energy is accumulated in the reactor 3. This operation is referred to as a "precharging charging operation". By repeating the precharging charging operation as described above, the output voltage is increased by the energy accumulated in the reactor 3 as illustrated in FIG. 8. Subsequently, after the output voltage becomes equal to or larger than a threshold, the mode of the DC power-supply device 10 shifts to a boosting mode.

When in the full-wave rectification mode, the voltage across the first capacitor 6a and the second capacitor 6b (the sum of the potentials) is $V_0$. In other words, the voltage across the first capacitor 6a is $V_0/2$ and the voltage across the second capacitor 6b is $V_0/2$. In this case, when the mode is switched from the full-wave rectification mode to the double voltage mode (the boosting mode), both the voltage across the first capacitor 6a and the voltage across the second capacitor 6b increase to a value larger than $V_0/2$. Therefore, the inrush current generated when switching from the full-wave rectification mode to the double voltage mode (the boosting mode) is generated due to the fact that there is a potential difference between the output voltage targeted during the double voltage mode (the boosting mode) and the voltage across the first capacitor 6a and the second capacitor 6b. Therefore, as illustrated in FIG. 8, by using the power-supply short-circuited state in (D) in FIG. 2, a short-circuit current is drawn out from a power supply, the drawn out current is suppressed to a peak current that is smaller than a charging current, and a precharging charging operation for charging the first capacitor 6a and the second capacitor 6b is performed, thereby eliminating the potential difference. In this manner, an inrush current generated after shifting to a normal state is suppressed.

Third Embodiment

Figure 9:
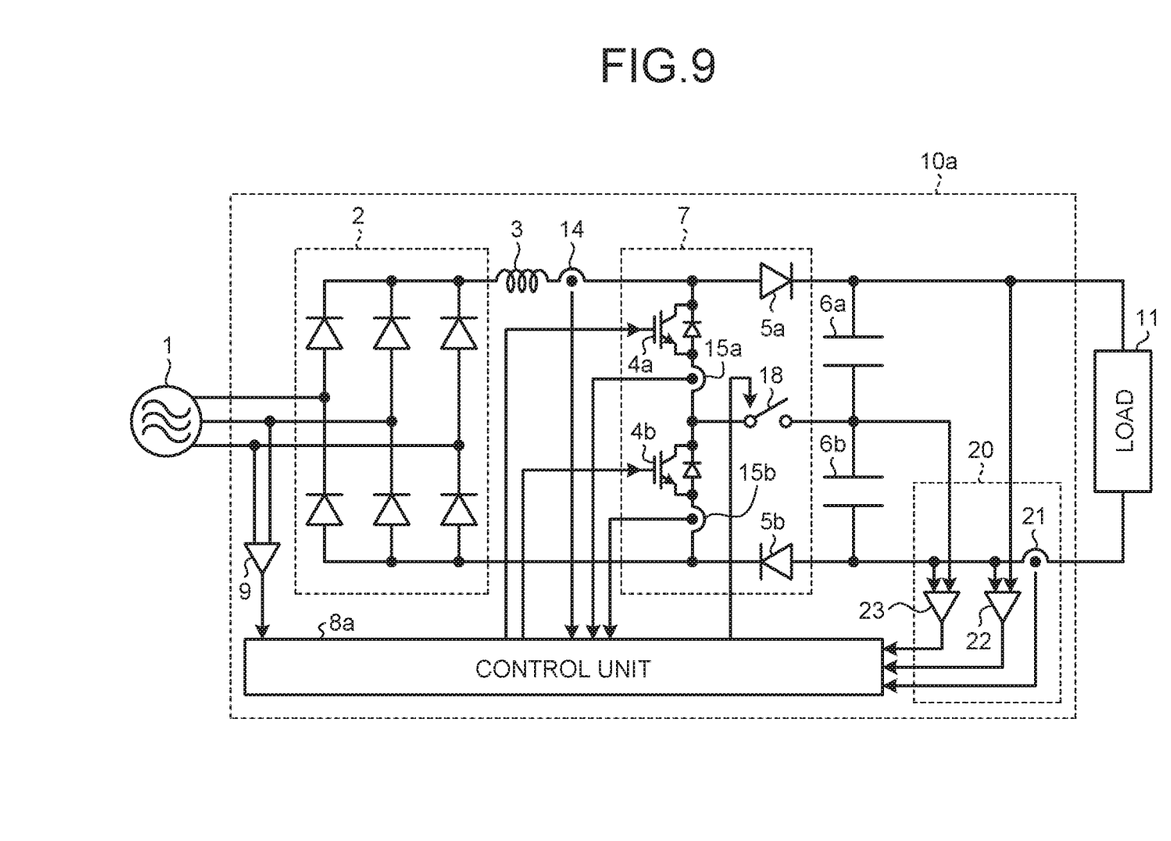
FIG. 9 is a diagram illustrating a configuration example of a DC power-supply device according to a third embodiment.

FIG. 9 is a diagram illustrating a configuration example of a DC power-supply device according to a third embodiment of the present invention. Constituent elements identical or equivalent to those of the first and second embodiments are denoted by like reference signs and detailed explanations thereof will be omitted.

A DC power-supply device 10a illustrated in FIG. 9 has a configuration in which the following elements are added to the DC power-supply device 10 illustrated in FIG. 1. The additional elements are a load-state detection unit 20 that detects the state of the load 11; a current sensor 14 that detects the current flowing into the reactor 3; a current sensor 15a that detects the current flowing into the first switching element 4a; a current sensor 15b that detects the current flowing into the second switching element 4b; and a protection relay 18 (a switching unit) that is inserted between the connection point between the first capacitor 6a and the second capacitor 6b and the connection point between the first switching element 4a and the second switching element 4b.

The load-state detection unit 20 includes an output-current detection unit 21 that detects the output voltage output to the load 11; an output-voltage detection unit 22 that detects the output voltage output to the load 11; and a capacitor-voltage detection unit 23 that detects the voltage of the second capacitor 6b.

Further, the output voltage value that is detected by the output-voltage detection unit 22 and output to the load 11 and the voltage value of the second capacitor 6b that is detected and output by the capacitor-voltage detection unit 23 are input to a control unit 8a of the DC power-supply device 10a. The voltage value of the first capacitor 6a can be calculated by acquiring the difference between the detection value of the capacitor-voltage detection unit 23 and the detection value of the output-voltage detection unit 22. Therefore, with this configuration, it is not necessary to provide a voltage-value detection unit with respect to the first capacitor 6a, and thus the area of the load-state detection unit 20 can be reduced. Further, it is obvious that this effect can be achieved even when detection of the voltage of the first capacitor 6a is performed using other methods.

The control unit 8a stops supply of an output signal to the first switching element 4a and the second switching element 4b according to the output value of the output-voltage detection unit 22 or the output value of the capacitor-voltage detection unit 23, and sets the protection relay 18 to be in an open state.

For example, the control unit 8a holds a reference voltage value of the output voltages from the output-voltage detection unit 22 and the capacitor-voltage detection unit 23 as a threshold, and when the output voltages exceed the threshold or becomes lower than the threshold, the control unit 8a executes control that stops supply of an output signal to the first switching element 4a and the second switching element 4b and opens the protection relay 18. The threshold as the reference voltage value of the output voltages is determined on the basis of, for example, the breakage resistance of the switching elements or the withstand voltage of the capacitors.

With this configuration and by opening the protection relay, even if an excessive voltage is generated due to an operational malfunction or an unstable operation of the DC power-supply device 10a or an erroneous operation of at least one of the first switching element and the second switching element, the DC power-supply device can be operated as long as it is in the full-wave rectification mode, and for example, if the load 11 is an inverter load that drives a compressor motor used in an air conditioner, a heat-pump water heater, a refrigerator, or a freezer, the load 11 can drive the compressor motor, and a temporary emergency operation can be performed.

Furthermore, the current values that are detected and output by the current sensors 14, 15a, and 15b are input to the control unit 8a of the DC power-supply device 10a illustrated in FIG. 9, and the control unit 8a stops supply of the output signals from the first switching element 4a and the second switching element 4b to open the protection relay 18. For example, the control unit 8a executes control such that the reference current value of the detected currents of the current sensors 14, 15a, and 15b is held as a threshold, and when the detected currents exceed the threshold, supply of the output signals from the first switching element 4a and the second switching element 4b is stopped, and the protection relay 18 is opened. The threshold as the reference current value of the output signals is determined on the basis of, for example, the breakage resistance of the switching elements.

With this configuration, even if an excessive current is generated due to an operational malfunction or an unstable operation of the DC power-supply device 10a or an erroneous operation of at least one of the first switching element and the second switching element, the DC power-supply device can be operated as long as it is in the full-wave rectification mode, and for example, if the load 11 is an inverter load that drives a compressor motor used in an air conditioner, a heat-pump water heater, a refrigerator, or a freezer, the load 11 can drive the compressor motor, and a temporary emergency operation can be performed.

As described above, according to the DC power-supply device of the present embodiment, the load-state detection unit 20 that detects the state of the load 11 includes the output-voltage detection unit 22 that detects the output voltage output to the load 11. When the output voltage value output to the load 11, which is the detection result from the output-voltage detection unit 22, exceeds a threshold or becomes lower than the threshold, supply of the output signals to the first switching element 4a and the second switching element 4b is stopped and the protection relay 18 is set to be in an open state. With this configuration, the DC power-supply device can be operated as long as it is in the full-wave rectification mode, and for example, if the load 11 is an inverter load that drives a compressor motor, a temporary operation of the compressor motor can be performed.

Furthermore, units (the current sensors 15a and 15b) that detect the currents flowing into respective switching elements or the current sensor 14 that detects the current flowing into the reactor 3 are provided, and when the values of the currents flowing into respective switching elements exceed a threshold, supply of the output signals to the first switching element 4a and the second switching element 4b is stopped, and the protection relay 18 is set to be in an open state. With this configuration, the DC power-supply device can be operated as long as it is in the full-wave rectification mode, and for example, if the load 11 is an inverter load that drives a compressor motor, a temporary operation of the compressor motor can be performed.

Fourth Embodiment

The DC power-supply device described in the first to third embodiments can be applied to, for example, a refrigeration cycle device. In the present embodiment, a specific configuration of a refrigeration cycle device to which the DC power-supply device according to the first to third embodiments is applied is described with reference to FIG. 10.

Figure 10:
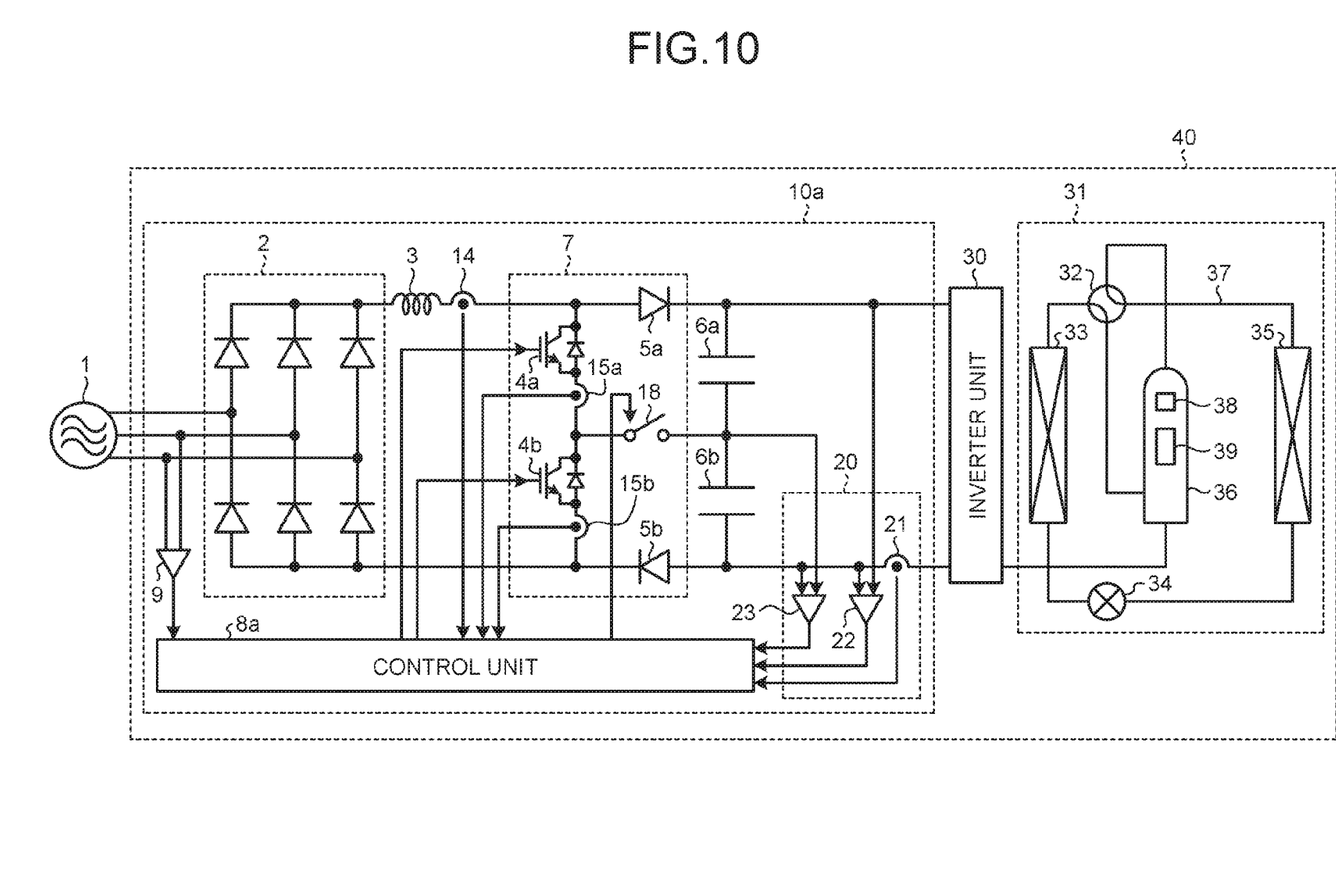
FIG. 10 is a diagram illustrating a configuration example of a refrigeration cycle device according to a fourth embodiment.

FIG. 10 is a diagram illustrating a configuration example of the refrigeration cycle device according to the fourth embodiment of the present invention. In FIG. 10, the DC power-supply device 10a in FIG. 9 is applied as the DC power-supply device, and, an inverter unit 30, which is the load 11, is connected to the DC power-supply device 10a. A refrigeration cycle unit 31 is connected to the inverter unit 30.

A refrigeration cycle device 40 illustrated in FIG. 10 can be exemplified by an air conditioner, a heat-pump water heater, a refrigerator, or a freezer.

The refrigeration cycle unit 31 is formed by connecting a four-way valve 32, an internal heat exchanger 33, an expansion mechanism 34, and a heat exchanger 35 via a refrigerant pipe 37. A compression mechanism 38 that compresses refrigerant and a compressor motor 39 that activates the compression mechanism 38 are provided in a compressor 36.

The compressor motor 39 is a three-phase motor including three-phase windings of a U-phase, a V-phase, and a W-phase, and is driven and controlled by the inverter unit 30 that is connected thereto as a load of the DC power-supply device 10a.

The refrigeration cycle device 40 illustrated in FIG. 10 can achieve the effects obtained by the DC power-supply device described in the first to third embodiments.

That is, when an excessive current is detected on the basis of the current information obtained from the detection result from the units (the current sensors 15a and 15b) that detect the currents flowing into respective switching elements or the current sensor 14 that detects the current flowing into the reactor 3, the first switching element 4a and the second switching element 4b are controlled such that they are off and the protection relay 18 is opened; therefore, it is possible to set the DC power-supply device to be in the full-wave rectification mode and to perform a stable operation. Note that, in this case, the output voltage is reduced to half.

Furthermore, even when imbalance in the potential across the first capacitor 6a and the second capacitor 6b is generated in accordance with the voltage information obtained from the detection result from the load-state detection unit 20, the first switching element 4a and the second switching element 4b are controlled such that they are off and the protection relay 18 is opened; therefore, it is possible to set the DC power-supply device to be in the full-wave rectification mode and to perform a stable operation. Note that, in this case, the output voltage is reduced to half.

Further, with regard to the shifting from the full-wave rectification mode to the double voltage mode, by changing the on-duty ratio within a percentage from 0% to 50% when the charging operation of the first capacitor 6a and the second capacitor 6b is started, it is possible to prevent an excessive current from flowing into the inverter unit 30.

Furthermore, the DC power-supply device according to the present embodiment can provide the voltage in the range from the voltage $V_0$ in the full-wave rectification mode to the voltage $2V_0$ in the double voltage mode or an even larger voltage, and can be used in various types of refrigeration cycle devices; therefore, it is possible to obtain a refrigerant cycle device having high versatility.

As described above, the DC power-supply device described in the first to third embodiments can be applied to the refrigeration cycle device according to the present embodiment, and the refrigeration cycle device can achieve the effects obtained by the DC power-supply device described in the first to third embodiments.

In the first switching element 4a and the second switching element 4b according to the first to third embodiments, in order to secure a path for a reflux current caused by line impedance, anti-parallel reflux diodes may be provided. By providing reflux diodes, it is possible to secure a path for consuming a generated reflux current.

While an Si semiconductor made of silicon can be used as the switching elements and the backflow prevention elements that constitute the charging unit 7 according to the first to third embodiments, a wide-bandgap semiconductor, such as silicon carbide (SiC), a gallium nitride (GaN) material, or diamond, can be also used. As the switching elements and the backflow prevention elements are formed from a wide-bandgap semiconductor, voltage endurance and allowable current density can be improved. Therefore, the switching elements and the backflow prevention elements can be downsized, and by using these downsized elements, the DC power-supply device itself can be downsized.

Furthermore, when the switching elements and the backflow prevention elements are formed from a wide-bandgap semiconductor, heat resistance of these elements can be improved. Therefore, downsizing of heat radiating fins in a heatsink and the air cooling in a water-cooled unit can be achieved, thereby enabling further downsizing of the DC power-supply device itself. Further, when the switching elements and the backflow prevention elements are formed from a wide-bandgap semiconductor, the power loss of these elements can be reduced. Therefore, the switching elements and the backflow prevention elements can have high efficiency, and thus the DC power-supply device itself can have high efficiency.

It is also possible that only one of the switching elements and the backflow prevention elements is formed from a wide-bandgap semiconductor, but even in this case, the effects described above can be achieved. In particular, when all the switching elements and the backflow prevention elements are formed from a wide-bandgap semiconductor, the effects described above can be prominent.

The switching elements used can be any of a power transistor, a power MOSFET, an IGBT, a MOSFET having a super junction structure, which is known as a highly efficient switching element, an insulated gate semiconductor device, and a bipolar transistor, and with any of these element, identical effects can be obtained.

Furthermore, while the control unit 8a can be configured by a CPU (Central Processing Unit), a DSP (Digital Signal Processor), or a discrete system of a microcomputer, the control unit 8a is not limited thereto, and can be also configured by an analog circuit or a digital circuit (an electrical circuit element).

The invention claimed is:

1. A DC power-supply device that converts an alternating current from a three-phase AC power supply into a direct current and supplies the converted current to a load, the DC power-supply device comprising:
   a rectifier circuit that has a reactor connected to an input side or an output side thereof and that rectifies the alternating current from the three-phase AC power supply;
   a first capacitor and a second capacitor that are connected in series between output terminals to the load;
   a charging unit that selectively charges one or both of the first capacitor and the second capacitor; and
   a control unit that controls the charging unit, wherein:
   the charging unit includes:
      a first switching element and a second switching element that are connected in series and are switched at a frequency that is a multiple n (where n is a natural number) of a frequency of the three-phase AC power supply,
      a first backflow prevention element that prevents backflow of a stored electric charge of the first capacitor to the first switching element, and
      a second backflow prevention element that prevents backflow of a stored electric charge of the second capacitor to the second switching element,
   a point between the first switching element and the second switching element and a point between the first capacitor and the second capacitor are connected to each other,
   the DC power-supply device further comprises a power-supply voltage detection unit,
   the control unit controls an operation mode,
   the operation mode includes:
      a full-wave rectification mode in which the first switching element and the second switching element are always turned off and on-duty ratios of the first switching element and the second switching element are 0%, and
      a boosting mode in which the first switching element and the second switching element are alternately turned on at a charging frequency, and
   in the boosting mode, an output voltage is controlled by gradually increasing the on-duty ratios of the first switching element and the second switching element.

2. The DC power-supply device according to claim 1, wherein
   when charging of the first capacitor and the second capacitor is started, a charging current is suppressed by reducing an on-duty ratio of the first switching element and the second switching element and suppressing a charging peak current flowing to the first capacitor and the second capacitor to be equal to or smaller than an allowable value of the charging unit or the rectifier circuit, and then,
   until an on-duty ratio during a normal operation is reached, the on-duty ratio of the first switching element and the second switching element is gradually increased as a predetermined time period is passed.

3. The DC power-supply device according to claim 2, wherein
   at least one of the first switching element, the second switching element, the first backflow prevention element, and the second backflow prevention element is formed from a wide-bandgap semiconductor.

4. The DC power-supply device according to claim 3, wherein the wide-bandgap semiconductor is silicon carbide, a gallium nitride material, or diamond.

5. The DC power-supply device according to claim 1, wherein
the control unit reduces an on-duty ratio when the full-wave rectification mode and the boosting mode are switched, and
the control unit subsequently executes control such that an on-time of the first switching element and the second switching element is changed gradually to shift to the boosting mode.

6. The DC power-supply device according to claim 1, wherein
by repeating the full-wave rectification mode and an operation mode that has a time period during which both the first switching element and the second switching element are simultaneously turned on, energy is accumulated in the reactor and an output voltage is increased, and
after the output voltage has become equal to or larger than a threshold, the DC power-supply device shifts to the boosting mode.

7. The DC power-supply device according to claim 1, wherein
the first switching element and the second switching element include anti-parallel reflux diodes.

8. The DC power-supply device according to claim 1, further comprising:
an output-voltage detection unit that detects an output voltage output to the load, the output voltage being equal to a voltage of the first capacitor and second capacitor that are connected in series; and
a capacitor-voltage detection unit that detects one of voltages of the first capacitor and the second capacitor, wherein
the control unit calculates another of the voltages of the first capacitor and the second capacitor on a basis of a difference between a detection value of the output-voltage detection unit and a detection value of the capacitor-voltage detection unit.

9. The DC power-supply device according to claim 1, further comprising
a protection relay inserted between a point between the first switching element and the second switching element and a point between the first capacitor and the second capacitor.

10. The DC power-supply device according to claim 9, wherein,
when a current flowing into the first switching element and the second switching element or a current flowing into the reactor exceeds a set threshold, the control unit stops an output of a switching signal to the first switching element and the second switching element and outputs a signal for opening the protection relay.

11. The DC power-supply device according to claim 9, further comprising
a load-state detection unit that detects a state of the load, wherein
when a detection value of a signal detected by the load-state detection unit and output from the load-state detection unit exceeds a set threshold, the control unit stops an output of a switching signal to the first switching element and the second switching element and outputs a signal for opening the protection relay.

12. A refrigeration cycle device comprising the DC power-supply device according to claim 1.

13. The refrigeration cycle device according to claim 12, wherein
the load includes an inverter unit that drives a compressor motor.

* * * * *